United States Patent
Milden et al.

(10) Patent No.: US 11,785,014 B1
(45) Date of Patent: *Oct. 10, 2023

(54) APPARATUS AND METHODS FOR SECURELY DELIVERING DIGITAL CONTENT

(71) Applicant: Wells Fargo Bank, N.A., San Francisco, CA (US)

(72) Inventors: Robert Milden, Waxhaw, NC (US); Terri C. Kennell, Jacksonville, FL (US); Chemere Davis, Pineville, NC (US); Matt Hord, Denver, NC (US); Abhijit Rao, Irvine, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 111 days.

This patent is subject to a terminal disclaimer.

(21) Appl. No.: 17/154,026

(22) Filed: Jan. 21, 2021

Related U.S. Application Data

(63) Continuation of application No. 15/885,241, filed on Jan. 31, 2018, now Pat. No. 10,944,755.

(51) Int. Cl.
*H04L 9/40* (2022.01)
*G06N 20/00* (2019.01)

(52) U.S. Cl.
CPC .......... *H04L 63/102* (2013.01); *G06N 20/00* (2019.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 7,383,433 | B2 ‡ | 6/2008 | Yeager | G06F 9/544 709/20 |
| 8,909,933 | B2 ‡ | 12/2014 | Pieczul | G06F 21/44 713/17 |

(Continued)

FOREIGN PATENT DOCUMENTS

| | | | |
|---|---|---|---|
| JP | 2009-017294 | ‡ | 1/2009 |
| JP | 2009-017294 A | | 1/2009 |

OTHER PUBLICATIONS

U.S. Appl. No. 15/885,241, filed Jan. 31, 2018, U.S. Pat. No. 10,944,755, Issued.

*Primary Examiner* — Trang T Doan
(74) *Attorney, Agent, or Firm* — K&L Gates LLP

(57) ABSTRACT

Methods, apparatuses, and computer program products are disclosed for securely delivering digital content to a user. An example method includes receiving a request for digital content for presentation by a first user device associated with a first user profile and receiving contextual device data of the first user device. The example method further include comparing the contextual device data of the first user device and a secure context dataset to determine a device delivery context of the first user device. In instances in which the contextual device data of the first user device fails to satisfy one or more security thresholds defined by the secure context dataset, the method determines an unsecure delivery context and generates secured digital content. The example method further includes causing presentation of the secured digital content via a second user device associated with the first user profile.

18 Claims, 6 Drawing Sheets

(56) References Cited

U.S. PATENT DOCUMENTS

| | | | | |
|---|---|---|---|---|
| 9,275,213 | B2 ‡ | 3/2016 | Kundu | H04L 9/3226 |
| 9,846,784 | B1 * | 12/2017 | Murray | H04L 63/105 |
| 10,831,827 | B2 * | 11/2020 | Gifford | G06F 16/9024 |
| 2009/0249422 | A1 ‡ | 10/2009 | Chen | H04N 7/163 |
| | | | | 725/116 |
| 2009/0316889 | A1 ‡ | 12/2009 | MacDonald | G06F 21/10 |
| | | | | 380/201 |
| 2015/0372998 | A1 * | 12/2015 | Elien | H04L 9/3263 |
| | | | | 713/168 |
| 2016/0248767 | A1 ‡ | 8/2016 | Le | H04L 63/102 |
| 2017/0026802 | A1 ‡ | 1/2017 | Bank | H04W 4/029 |
| 2017/0046527 | A1 * | 2/2017 | Goyal | H04L 63/08 |
| 2017/0124349 | A1 ‡ | 5/2017 | Anantapur Bache | |
| | | | | G06F 21/6245 |
| 2017/0161506 | A1 ‡ | 6/2017 | Gates | H04W 12/02 |
| 2017/0272972 | A1 * | 9/2017 | Egner | H04L 47/2441 |
| 2018/0091873 | A1 * | 3/2018 | Navin | G06Q 30/0277 |
| 2018/0191800 | A1 * | 7/2018 | Henaire | H04L 65/611 |
| 2020/0050784 | A1 * | 2/2020 | Ellam | G06F 21/6218 |

\* cited by examiner
‡ imported from a related application

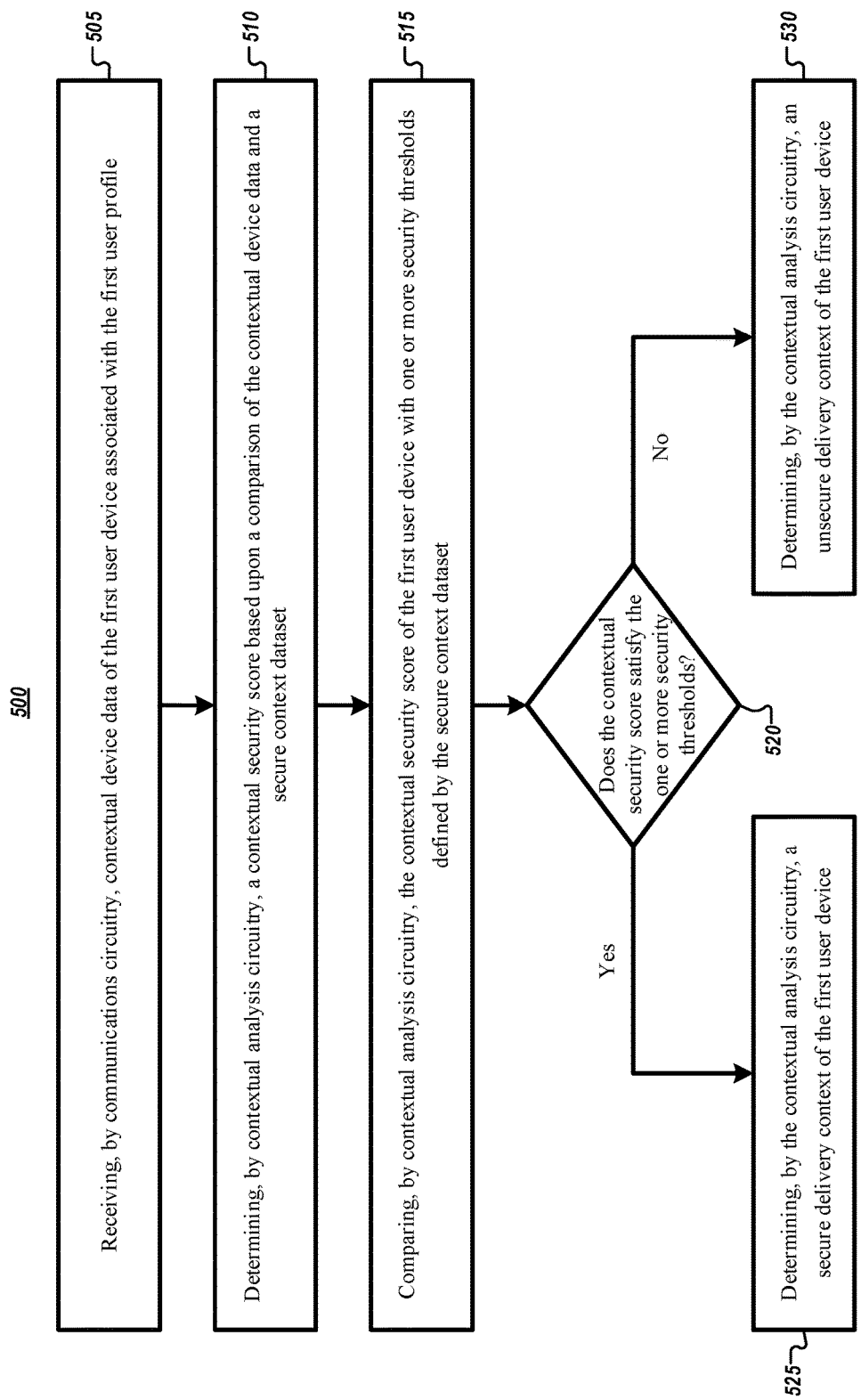

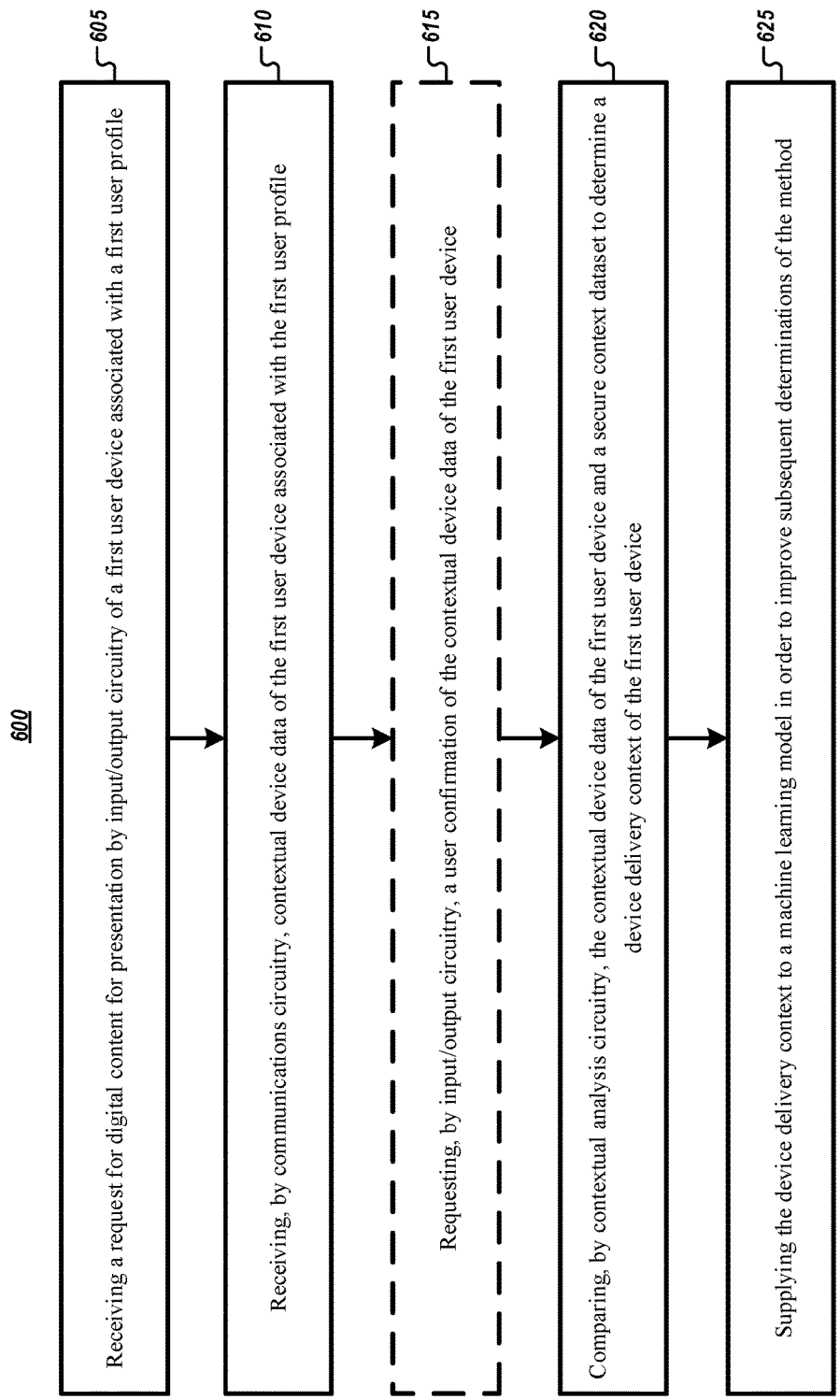

APPARATUS AND METHODS FOR SECURELY DELIVERING DIGITAL CONTENT

CROSS REFERENCES TO RELATED APPLICATIONS

This application claims the benefit of priority to U.S. application Ser. No. 15/885,241, filed Jan. 31, 2018 and titled, "APPARATUS AND METHODS FOR SECURELY DELIVERING DIGITAL CONTENT," and is hereby incorporated by reference in its entirety.

TECHNOLOGICAL FIELD

Example embodiments of the present invention relate generally to presenting digital content and, more particularly, to securely delivering digital content to a user.

BACKGROUND

The inventor has discovered problems with traditional systems for securing digital content. Through applied effort, ingenuity, and innovation, the inventor has solved many of these identified problems by developing solutions embodied by the present invention and described in detail below.

BRIEF SUMMARY

Conventional methods and systems for providing or otherwise making available digital content to end users often rely upon transmittal of the digital content to a single user device, account, or the like that the system believes to be secure. Traditionally, this security requires that a user register his or her device or create an account in order to access or receive the digital content. The use of a single user device or account, however, may lead to reduced security for the digital content. For example, a user's email address, account credentials, or device may be stolen or otherwise known to an unauthorized party. Furthermore, even in instances in which the user's credentials remain uncompromised, presentation of the digital content on a user's device may allow other unauthorized users to view the digital content due to their physical proximity to the display of the user's device.

The technical challenge of securing digital content has traditionally be driven by the prior inability of systems to access multiple devices associated with the same user. Without ready access to multiple devices, users of traditional systems have not had access to practical tools for dynamically securing digital content through the strategic use of presentation interfaces of the multiple devices. And given the advancement of the sophistication of the various devices available to users today, such devices provide new tools for employing these strategies based upon a new and wider range of contextual information regarding the context surrounding the user. The inventors have identified that the current increase in the number of user devices (e.g., smartphones, tablets, smart glasses, wearable technology, and the like) associated with a single user thus has created a new opportunity for solutions for securing digital content which were historically unavailable.

To solve these issues and harness this new potential, example implementations of embodiments of the present invention may receive contextual data of one or more user devices associated with a particular user profile. This contextual device data may include data indicative of the location of the user device as well as various permissions data related to the user's permission to access digital content. Example implementations described herein then compare the contextual device data with one or more security thresholds to determine a device delivery context. In instances in which the device delivery context is unsecure, the example implementations may secure the digital content and may cause presentation of the secure digital content on a second user device associated with the particular user profile. In doing so, such example implementations confront and solve at least two technical challenges: (1) they reliably detect the context of a user and associated user device and (2) they securely present digital content to the user based upon the determined context of the user.

Systems, apparatuses, methods, and computer program products are disclosed herein for securely delivering digital content. In one embodiment, with reference to the claimed method, a method for securely delivering digital content to a user is provided. The method may include receiving a request for digital content for presentation by input/output circuitry of a first user device associated with a first user profile and receiving, by communications circuitry, contextual device data of the first user device associated with the first user profile. The method may further include comparing, by contextual analysis circuitry, the contextual device data of the first user device and a secure context dataset to determine a device delivery context of the first user device, and, in response to determining the device delivery context of the first user device, determining, by the contextual analysis circuitry, an unsecure delivery context of the first user device in an instance in which the contextual device data of the first user device fails to satisfy one or more security thresholds defined by the secure context dataset. The method may further include, in response to determining the unsecure delivery context, generating, by content protection circuitry, secured digital content and causing presentation of the secured digital content via a second user device associated with the first user profile.

In some embodiments, causing presentation of the secured digital content may include encrypting, by encryption/decryption circuitry, the secured digital content and transmitting the encrypted secured digital content to the first user device. In such an embodiment, the method may include generating, by the encryption/decryption circuitry, a decryption key, and transmitting the decryption key to a second user device associated with the first user profile.

In a further embodiment, the decryption key may include instructions for decrypting the encrypted secured digital content on the first user device.

In a still further embodiment, the decryption key may include instructions for rendering the encrypted secured digital content of the first user device on the second user device in a decrypted form.

In another embodiment, determining a device delivery context of the first user device may include generating, by the contextual analysis circuitry, a contextual security score based upon the contextual device data and the secure context dataset.

In yet another embodiment, determining a device delivery context of the first user device may include analyzing, by the contextual analysis circuitry, one or more first user security permissions defined by the first user profile.

In some embodiments, the method may include requesting, by input/output circuitry, a user confirmation of the contextual device data of the first user device.

In other embodiments, upon determining the device delivery context of the first user device, the method may include supplying the device delivery context to a machine learning model in order to improve subsequent determinations of the method.

In any embodiment, the contextual device data may include geographic locations data of the first user device and the secured digital content may include timing restrictions data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the present disclosure.

FIG. 5 illustrates an example flowchart for determining a contextual security score in accordance with some example embodiments described herein; and FIG. 6 illustrates an example flowchart for requesting user confirmed contextual device data for training a machine learning model in accordance with some example embodiments described herein.

DETAILED DESCRIPTION

Figure 1:
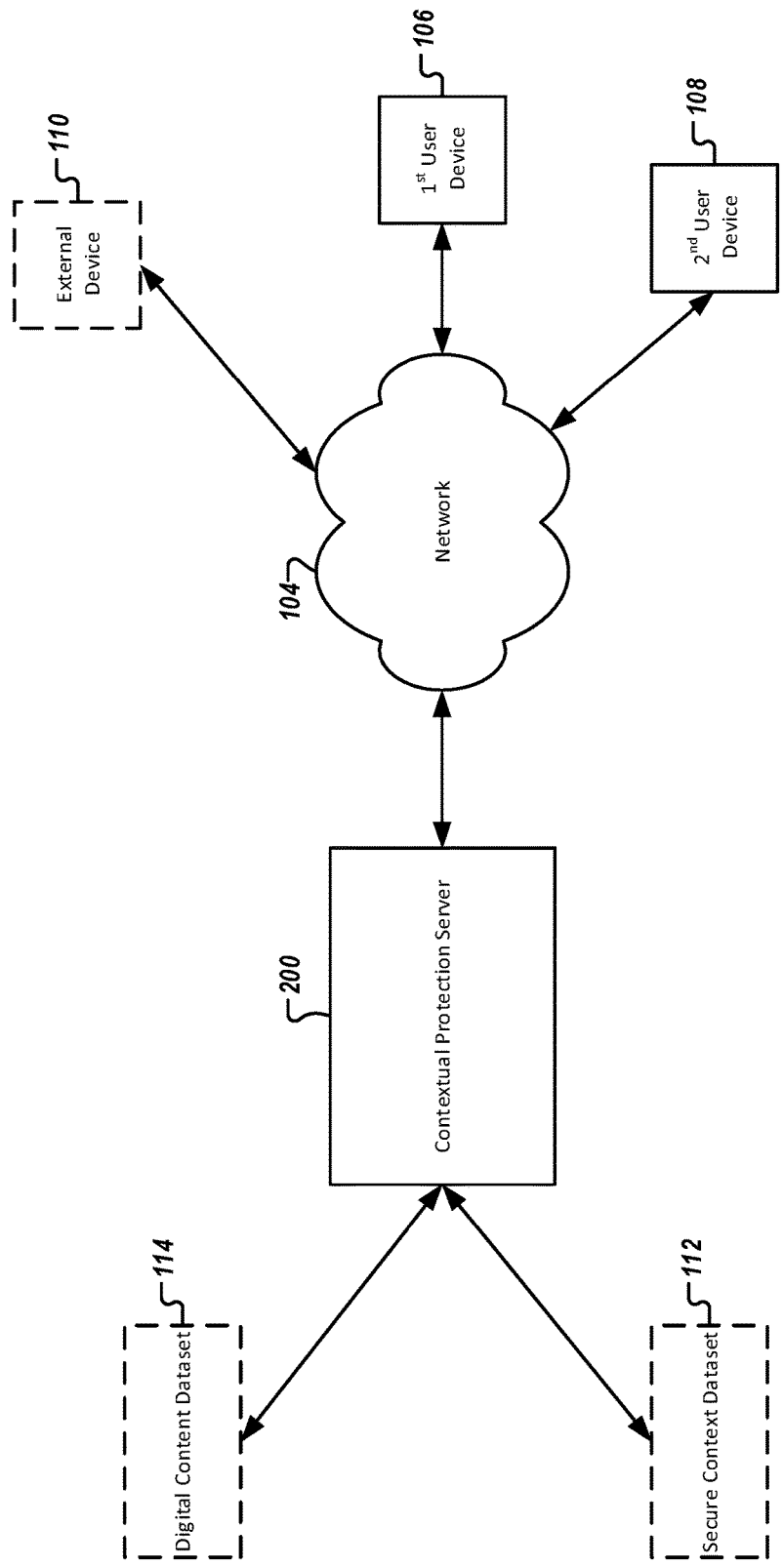
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an "apparatus." However, elements of the apparatus described herein may be equally applicable to the claimed method and computer program product. Thus, use of any such terms should not be taken to limit the spirit and scope of embodiments of the present invention.

Overview

As noted above, methods, apparatuses, systems, and computer-program products are described herein that provide solutions to the problems identified above, as well as others. In some example embodiments, an apparatus (e.g., a contextual protection server) is provided that may securely deliver digital content to a user. As described below with reference to the flowcharts illustrated in FIGS. 3-6, an example apparatus (e.g., a contextual protection server) may receive a request for digital content for presentation by a first user device associated with a first user profile. This request may, in some embodiments, be transmitted by the first user device or by another user device associated with the first user profile (e.g., a second user device). In other embodiments, this request may be made by an external device (e.g., external server, networking device, or the like) in communication with the first user device (e.g., via a network or the like). In some example embodiments, the contextual protection server may further receive contextual device data of the first user device associated with the first user profile. This contextual device data may function to represent the context surrounding the first user device (e.g., for determining the corresponding security requirements of said context) and may include various contextual data entries including but not limited to geographic location data of the first user device, first user profile security permissions data, digital content security permissions data, and the like. The contextual device data may be compared with a secure context dataset to determine a device delivery context of the first user device (e.g., is the first user device in a secure context or an unsecure context).

In some example embodiments, the contextual protection server may determine an unsecure delivery context of the first user device in an instance in which the contextual device data of the first user device fails to satisfy one or more security thresholds defined by the secure context dataset. These one or more security thresholds defined by the secure context dataset may, in some embodiments, include threshold values indicative of secure locations. By way of example, in some embodiments, the one or more security thresholds may include geographic location data of known secure locations (e.g., defined via user input, system parameters, or the like) such that the first user device is determined to be in a secure delivery context when the contextual device data of the first user device is included in the secure context dataset, and the first user device is similarly determined to be in an unsecure delivery context when the contextual device data of the first user device is not included in the secure context dataset. In response to determining the unsecure delivery context, the contextual protection server, in some embodiments, may generate secured digital content and may cause presentation of the secured digital content via a second user device associated with the first user profile.

In some example embodiments, not mutually exclusive of those described above, an contextual protection server may be configured to cause presentation of the secured digital content via various interactions between the first user device and a second user device, each associated with the first user profile. By way of example, in some embodiments, the contextual protection server may encrypt the secured digital content and may transmit encrypted secured digital content to the first user device. The contextual protection server may also generate a decryption key and may transmit the decryption key to the second user device. In this way, the second user device may operate to decrypt the encrypted secured digital content for presentation on the first user device. By way of another example, in some embodiments, the contextual protection server may cause presentation of the secured digital content by transmitting the digital content requested by the first user device for rendering on the second user device, such as in instances in which the second user device is only viewable by the user (e.g., smart glasses or the like).

Accordingly, example embodiments thus secure digital content based upon the context of the first user device and present the secured digital content to the user via various interactions between the first user device and a second user device associated with the first user profile. Greater detail is provided below regarding certain example embodiments contemplated herein.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "digital content" refers to any electronic media item that is intended to be used in an electronic form and which is renderable by one or more software applications that are accessible by the apparatus (e.g., contextual protection server 200 in FIG. 1). For example, digital content may include images, video files, text files, and the like. Digital content may be further used to include any software application, application program, mobile application, or the like. For example, a software application (e.g., digital content) may include word processors, email, calendars, shared workspaces, software development tools, project management tools, collaborative spaces, or the like.

As used herein, the terms "user profile" and "first user profile" refer to a collection of settings, configurations, identifiers, data, and information associated with a specific user. A user profile configured in accordance with the present invention may be accessible by one or more of the software applications that are supported by the contextual protection server and, thus, may include application-specific preferences, settings, configurations, data, and information. In some example embodiments, a first user profile may include first user security permissions reported by the first user device as defined hereafter.

As used herein, the terms "first user security permissions," "user security permissions," and "permissions" refer to configurations, settings, instructions, and/or data that may be interpreted by a computer system (e.g., a contextual protection server of the present disclosure) to allow (or restrict) a user to access, use, and/or display digital content. By way of example, a first user security permission may instruct the contextual protection server to enable display of digital content authored by the first user device (e.g., the associated first user profile) only when the first user device is located in a predefined user location (e.g., via connection to a specified Wi-Fi access point).

As used herein, the terms "user device," "first user device," "second user device," and the like refer to computer hardware and/or software that is configured to access a service made available by the contextual protection server and, among various other functions, is configured to directly, or indirectly, transmit and receive at least device location data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the contextual protection server via Bluetooth, NFC, Wi-Fi, 3G, 4G, RFID protocols, and the like. By way of a particular example, a first user device may be a laptop computer and a second user device may be smart glasses, where each user device is equipped with a Wi-Fi radio that is configured to communicate with a Wi-Fi access point that is in communication with the a server (e.g., a contextual protection server of the present disclosure) via a network.

As used herein, the term "external device" refers to any object, device, or system which may be in network communication with one or more of the first user device, the second user device, or the contextual protection server, but is not associated with the first user profile. For example, an external device may be an external server or computing device (e.g., associated with a corporation, banking entity, or other 3$^{rd}$ party) that may request, receive, and/or provide digital content to or from one or more of the devices described above. By way of a more particular example, an external device may include a server of a bank configured to supply, in response to a request for digital content (e.g., account information, transaction history, or the like) by a user (e.g., transmitted by user device), digital content to a user via one or more user devices associated with the user at various levels of protection as described hereafter (e.g., based upon a context of the user).

As used herein, the term "security threshold" refers to geographic location data of known secure locations (e.g., defined via a user input, set by a system administrator, or the like). In some embodiments, a security threshold more specifically refers to a mathematical difference between the geographic location of the first user device and/or second user device and one or more known secure locations. By way of example, in some embodiments, determination of whether a security threshold is satisfied may be binary in operation. Said differently, the geographic location of the first user device and/or second user device is determined to be either at a secure location or not. In other embodiments, a security threshold may refer to a defined area (e.g., a secure radius defined by a Wi-Fi access point, an office building's footprint, or the like) defined by a known secure location such that satisfying the security threshold occurs when calculation of the mathematical difference between the geographic location of the first user device and/or second user device and the known secure location is less than a predetermined distance value of the defined area.

As used herein, the term "secure context dataset" refers to a structured data set or repository for storing contextual user device data. By way of example, the secure context dataset may store locations data accessible by the contextual protection server, where the location data is associated with the geographic coordinates or location of various secure delivery contexts as described hereinafter. The data stored by the secure context dataset may be inputted by a user, set by a system administrator, and/or may be programmatically determined by the contextual protection server through a machine learning model.

As used herein, the term "digital content dataset" refers to a structured data set or repository for storing digital content accessible by the contextual protection server, where the digital content is associated with and/or accessible by one or more software applications.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a contextual protection server 200) communicably connected with a first user device 106, a second user device 108, and an external device 110 via a network 104. The example system 100 may also include a digital content dataset 114 and secure context dataset 112 in communication with the contextual protection server 200.

The contextual protection server 200 may include circuitry, networked processors, or the like configured to perform some or all of the apparatus-based (e.g., contextual protection server-based) processes described herein, and may be any suitable network server and/or other type of processing device. In some embodiments, the contextual protection server 200 may function as a "cloud" with respect to the first user device 106 and the second user device 108. In that sense, the contextual protection server 200 may include several servers performing interconnected and/or distributed functions. To avoid unnecessarily overcomplicating the disclosure, the contextual protection server 200 is shown and described herein as a single server.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 106 may be associated with a first user and first user profile. Additional user devices (i.e., second user device 108) may be also be associated with the first user and the first user profile. Although two user devices are shown, the example system 100 may include any number of user devices that may be associated with various other users and/or user profiles. The first user device 106 and the second user device 108 may be cellular telephones (including smartphones and/or other types of mobile telephones), laptops, tablets, electronic readers, e-book devices, media devices, wearables, smart glasses, smartwatches, or any combination of the above.

The external device 110, as defined above, may be associated with any entity that is not associated with the first user device profile. By way of a more particular example, the external device 110 may include a server of a bank configured to supply requested digital content (e.g., account information, transaction history, or the like) to the first user device 106 and/or the second user device 108 via the network 104. Although shown as a single external device 110, the system 100 may include any number of external devices.

In some embodiments, the first user device 106 and the second user device 108 may each be configured to request and/or display digital content. The user devices (e.g., first user device 106 and second user device 108) may also allow a user to input commands (such as selecting particular digital content) which may be conveyed to the contextual protection server 200 via the network 104 as input data. Input data may be generated via one or more input devices including, without limitation, a touchscreen, a microphone, a camera, and/or a motion sensor device (e.g., an accelerometer, gyroscope, etc.).

The digital content dataset 114 may be any suitable network storage device configured to store some or all of the information described herein. The digital content dataset 114 may receive data from the contextual protection server 200 (e.g., via a memory 204 and/or processor(s) 202), and may store this data. As such, the digital content dataset 114 may include, for example, one or more database systems, back-end data servers, network databases, cloud storage devices, etc. To avoid unnecessarily overcomplicating the disclosure, the digital content dataset 114 is shown and described herein as a single dataset.

The secure context dataset 112 may be any suitable network storage device configured to store some or all of the information described herein. The secure context dataset 112 may receive data from the contextual protection server 200 (e.g., via a memory 204 and/or processor(s) 202), and may store this data. As such, the secure context dataset 112 may include, for example, one or more database systems, back-end data servers, network databases, cloud storage devices, etc. To avoid unnecessarily overcomplicating the disclosure, the secure context dataset 112 is shown and described herein as a single database.

Apparatuses (e.g., contextual protection server 200) of the present invention may be embodied by any of a variety of devices. For example, the contextual protection server 200 may be configured to securely deliver digital content and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection with example contextual protection server 200. It will be understood that the contextual protection server 200 is illustrated as a single apparatus in FIG. 1 for ease of illustration. In some embodiments, one or more components of the contextual protection server 200 may be wholly or partially housed within one or more of the first user device 106, the second user device 108, or the external device 110. Similarly, although the digital content dataset 114 and the secure context dataset 112 are also illustrated as stand-alone elements in FIG. 1, in some embodiments the digital content dataset 114 (e.g., account information, transaction history, or the like) may be housed by the external device 110 (e.g., a banking entity) while the secure context dataset 112 (e.g., known secure locations) may be housed, in whole or in part, by either the first user device 106 or the second user device 108.

Figure 2:
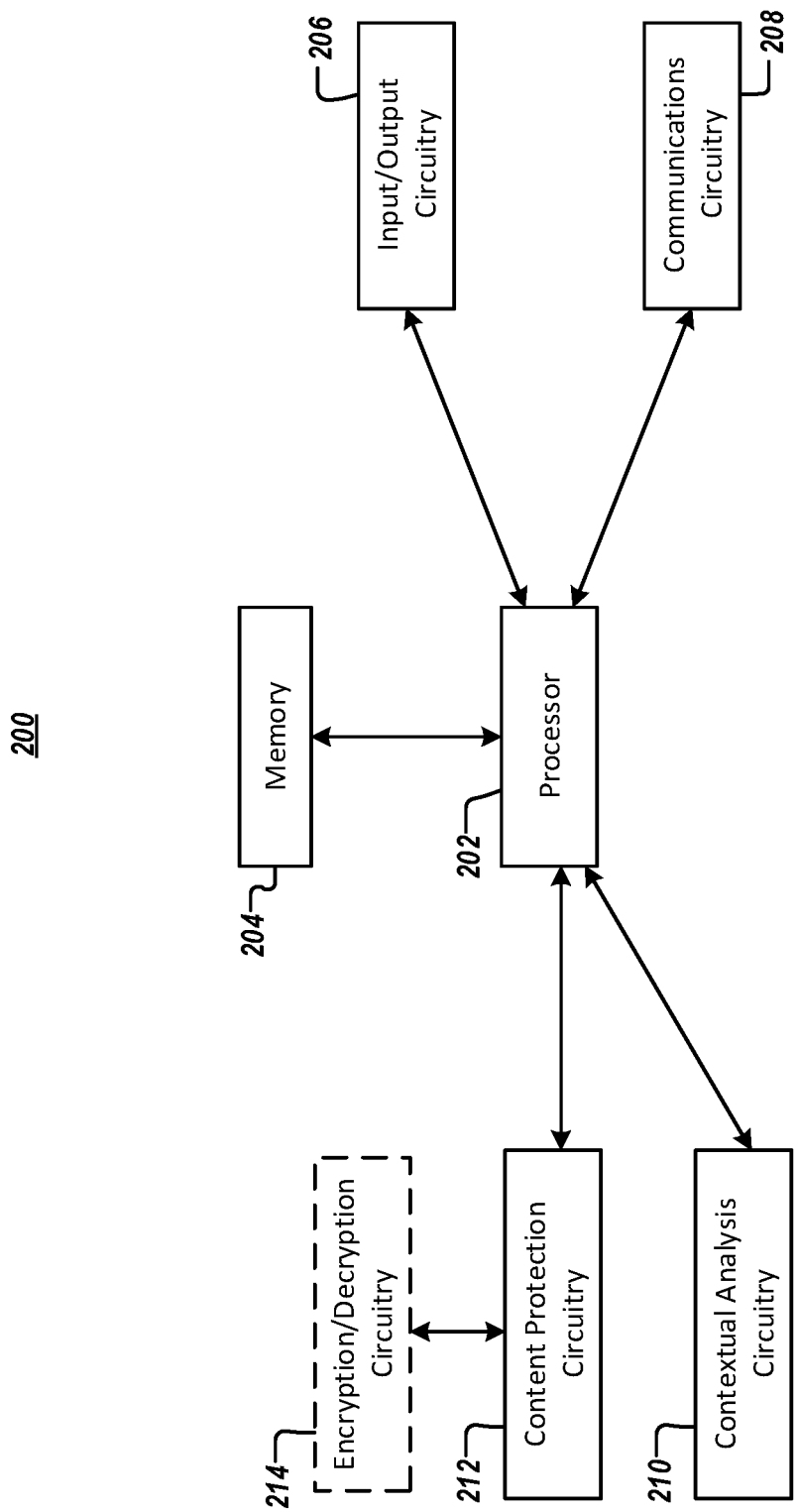
FIG. 2 illustrates a schematic block diagram of example circuitry that may perform various operations in accordance with some example embodiments described herein.

As illustrated in FIG. 2, the contextual protection server 200 may include a processor 202, a memory 204, input/output circuitry 206, and communications circuitry 208. Moreover, contextual protection server 200 may include contextual analysis circuitry 210, content protection circuitry 212, and, in some embodiments, encryption/decryption circuitry 214. The contextual protection server 200 may be configured to execute the operations described below in connection with FIGS. 3-6. Although these components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein with respect to components of the contextual protection server therefore includes particular hardware configured to perform the functions associated with respective circuitry described herein. As described in the example above, in some embodiments, various elements or components of the circuitry of the contextual protection server 200 may be housed within one or more of the first user device 106, the second user device 108, or the external device 110. As indicated previously, it will be understood in this regard that some of the components described in connection with the contextual protection server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the contextual protection server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the contextual protection server. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the contextual protection server to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the contextual protection server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The contextual protection server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of display through computer program instructions (e.g., software and/or firmware) stored on a memory accessible to the processor (e.g., memory 204, and/or the like), such as to display secured digital objects.

The communications circuitry 208 may be any means such as a device or circuitry embodied in either hardware or a combination of hardware and software that is configured to receive and/or transmit data from/to a network and/or any other device, circuitry, or module in communication with the contextual protection server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the contextual protection server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Contextual analysis circuitry 210 includes hardware components designed to compare contextual device data of the first user device 106 and associated first user profile with a secure context dataset 112. The contextual analysis circuitry 210 may further include hardware components designed to determine a device delivery context of the first user device 106. These hardware components may, for instance, utilize elements of input/output circuitry 206 to receive contextual device data from the first user device 106, and memory 204 to retrieve stored values for one or more security thresholds. Contextual analysis circuitry 210 may utilize processing circuitry, such as the processor 202, to perform its corresponding operations, and may utilize memory 204 to store collected information.

Content protection circuitry 212 includes hardware components designed to generate secured digital content for presentation by the second user device 108. The content protection circuitry 212 may further include, in some embodiments, encryption/decryption circuitry 214 for generating secured digital content (i.e., via encrypting the digital content). Content protection circuitry 212 may utilize processing circuitry, such as the processor 202, to perform its corresponding operations, and may utilize memory 204 to store collected information.

It should also be appreciated that, in some embodiments, the contextual analysis circuitry 210, content protection circuitry 212, or encryption/decryption circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable contextual protection server's circuitry to produce a machine, such that the computer, processor other programmable circuitry that execute the code on the machine create the means for implementing the various functions, including those described in connection with the components of contextual protection server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Securely Delivering Digital Content

Figure 3:
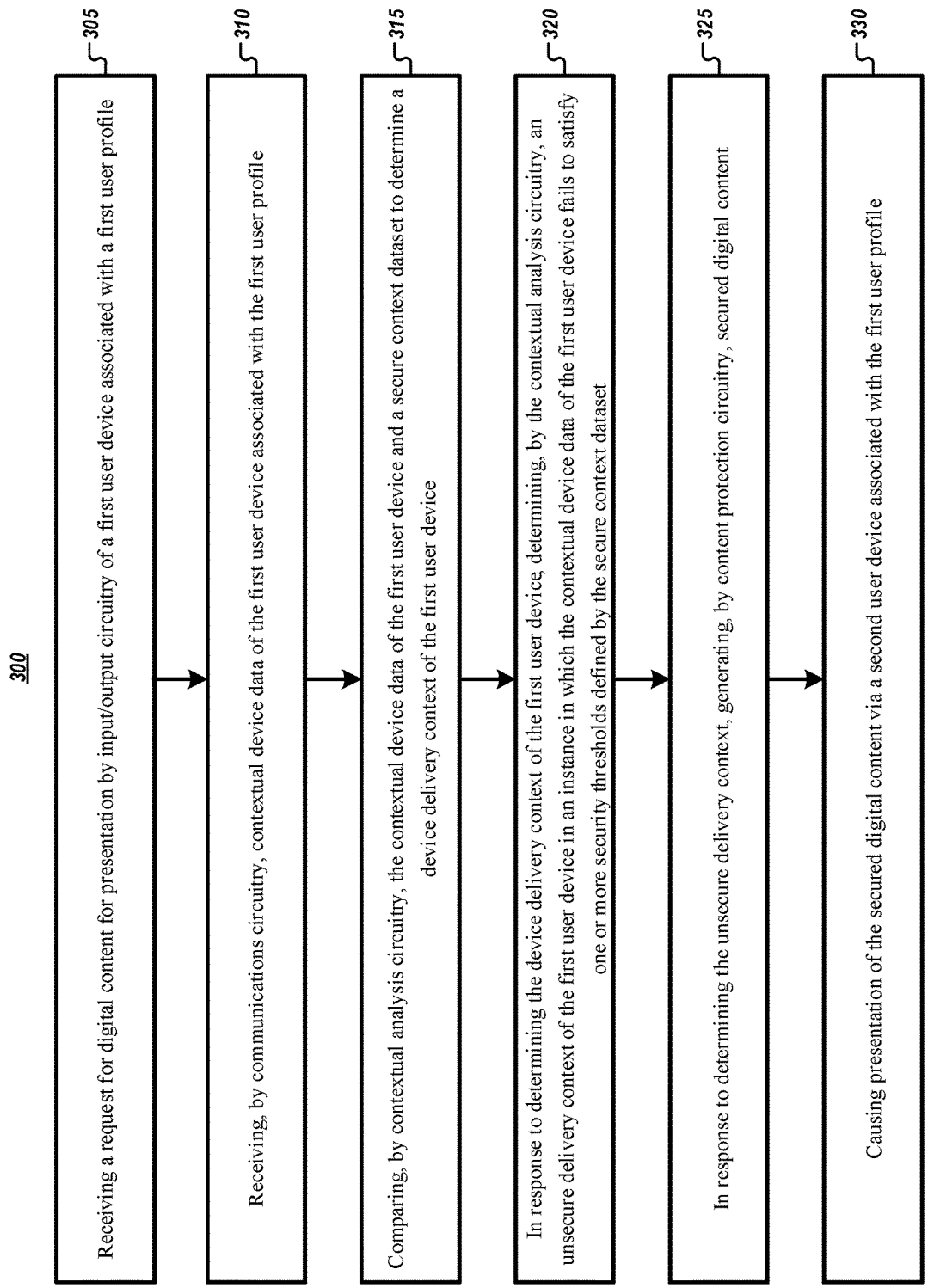
FIG. 3 illustrates an example flowchart for securely delivering digital content to a user in accordance with some example embodiments described herein.

Turning to FIG. 3, a flowchart is illustrated that contains operations for using an apparatus (e.g., contextual protection server) to securely delivery digital content to a user. The operations illustrated in FIG. 3 may, for example, be performed by the contextual protection server 200, as described above. In this regard, the contextual protection server 200 illustrates example components included such that the operations described herein may be performed by or through the use of one or more of processor 202, memory 204, input/output circuitry 206, communications circuitry 208, contextual analysis circuitry 210, content protection circuitry 212, or encryption/decryption circuitry 214.

With continued reference to FIG. 3, the contextual protection server 200 may further include means, such as the processor 202, the input/output circuitry 206, the communications circuitry 208, or the like, for receiving a request for digital content for presentation by input/output circuitry of a first user device 106 associated with a first user profile at Block 305. In some embodiments, the request for digital content may be transmitted by the first user device 106 by a user inputting (e.g., via input/output circuitry of the first user device 106) a request for digital content at the first user device 106. By way of example, a user may enter a request for access to a word processing document (e.g., digital content) stored by the digital content dataset 114 via an associated laptop computer (e.g., first user device 106) of the user. In this instance, the request at Block 305 refers to a manual user request for digital content.

In some embodiments, however, the first user device 106 may periodically or automatically request digital content at Block 305. In some embodiments, the first user device 106 may determine that digital content is required due to the location of the first user device 106 and/or an unrelated input by the user. By way of example, a laptop computer (e.g., first user device 106) may be running a software application (e.g., digital content) that is configured to periodically request digital content in order to maintain the rendered software application (e.g., digital content) on the laptop computer. Similarly, the laptop computer (e.g., first user device 106) may also automatically request digital content based upon the location of the laptop computer or an unrelated input by the user. For example, the laptop computer (e.g., first user device 106) may automatically request digital content at Block 305 when the laptop connects to a Wi-Fi access point at the user's office and/or may automatically request digital content when the user logs-in or otherwise request access to network software (e.g., office intranet, database, or the like) via the laptop computer.

The contextual protection server 200 may further include means, such as the processor 202, the input/output circuitry 206, the communications circuitry 208, or the like, for receiving contextual device data of the first user device 106 associated with the first user profile at Block 310. As described in general above, this contextual device data may function to represent the context surrounding the first user device 106 (e.g., for determining the corresponding security requirements of said context) and may include various contextual data entries including but not limited to geographic location data of the first user device 106, first user profile security permissions data, digital content security permissions data, and the like. In some embodiments, the contextual device data may include geographic location data such that the contextual protection server 200 may receive geographic location data entries representative of the physical location of the first user device 106. In such an embodiment, the location data of the first user device 106 may be generated by the first user device 106 using Global Positioning Satellite ("GPS") technologies. Alternatively or additionally, in some embodiments, the location data may be generated by detection of a LAN or access point (e.g., Bluetooth or Wi-Fi technologies) or by reading a tag having a known location (e.g., Radio-frequency identification ("RFID"), QR code, or barcode technologies) using a user device coupled reader or scanner.

In some embodiments, the contextual device data may include first user profile security permissions data. As defined above in reference to the first user profile, in some embodiments, the first user profile security permissions may include settings, instructions, and/or data that may be interpreted by the contextual protection server 200. The contextual protection server 200 may analyze the first user profile security permissions data and allow or restrict access to digital content by the first user device 106 based upon the context of the first user device 106. By way of example, upon access to the first user security permission data, the contextual protection server 200 may restrict access of a laptop computer (e.g., first user device 106) associated with a particular user for particular word processing documents (e.g., digital content) to instances in which the laptop computer is located in a predetermined user location (e.g., as determined by connection to a specified Wi-Fi access point) such as a user's home or office address. Similarly, the contextual device data may also include digital content security permissions data. The contextual protection sever 200 may, upon access to the digital content security permission data, may restrict or allow access based upon the context of the digital content. By way of example, a particular word processing document (e.g., digital content) may only be accessible by particular user profiles (e.g., those users having appropriate permissions). Accordingly, the contextual protection server 200 may analyze the permissions (e.g., digital content security permission data) defined by the word processing document (e.g., digital content), and may restrict or allow access to the word processing document by the first user device 106.

The contextual protection server 200 may further include means, such as the processor 202, the input/output circuitry 206, the contextual analysis circuitry 210, or the like, for comparing the contextual device data of the first user device 106 and a secure context dataset 112 to determine a device delivery context of the first user device 106 at Block 315. As described in general above, the secure context dataset 112 may include one or more secure locations known to the contextual protection server 200. By way of example, the secure context dataset 112 may store locations data accessible by the contextual protection server 200, where the location data is associated with the geographic coordinates or one or more locations of various secure delivery contexts. The data stored by the secure context dataset 112 may be inputted by a user, set by a system administrator, and/or may be programmatically determined by the contextual protection server 200 through a machine learning model (e.g., described hereinafter with reference to FIG. 6).

By way of example, in some embodiments, comparison the contextual device data of the first user device 106 and a secure context dataset 112 may be binary in operation such that the comparison includes determining whether or not the geographic location data of the first user device 106 is contained within the secure context dataset 112. By way of example, the secure context dataset 112 may be configured to include selected wireless access points, geographic locations, and the like that correspond to known secure locations (e.g., an office Wi-Fi network, a home GPS location, etc.). In such an example, the contextual protection server 200 may compare the contextual device data of a laptop computer (e.g., first user device 106) with the known secure locations and determine if the contextual device data corresponds to (or in some embodiments, matches) at least one of the known secure locations contained within the secure context dataset 112, such that the first user device 106 is determined to be in a secure delivery context when the contextual device data of the first user device 106 is included in the secure context dataset 112, and the first user device 106 is similarly determined to be in an unsecure delivery context when the contextual device data of the first user device 106 is not included in the secure context dataset 112.

The contextual protection server 200 may further include means, such as the processor 202, the input/output circuitry 206, the contextual analysis circuitry 210, or the like, for, in response to determining the device delivery context of the first user device 106, determining an unsecure delivery context of the first user device 106 in an instance in which the contextual device data of the first user device 106 fails to satisfy one or more security thresholds defined by the secure context dataset 112 at Block 320. As described above with reference to the comparison at Block 315, in some embodiments, the one or more security thresholds defined by the secure context dataset 112 include known secure locations such that the determination of an unsecure delivery context corresponds to a binary comparison (i.e., the geographic location of the first user device and/or second user device is determined to be either at a secure location or not). By way of example, the contextual protection server 200 may compare the contextual device data of the first user device 106 (e.g., connection to an unsecure Wi-Fi access point) and may determine that an unsecure delivery context exists in an instance in which the contextual device data is not found in the secure context dataset (e.g., the unsecure Wi-Fi access point is not found in a list of secure access points defined by the secure context dataset).

In some embodiments, however, comparing the contextual device data with one or more security thresholds may more specifically refer to calculating a mathematical difference between the geographic location of the first user device 106 and/or second user device 108 (e.g., GPS location data) and one or more known secure locations (e.g., defined by GPS location data). By way of example, in some embodiments, the one or more security thresholds defined by the secure context dataset 112 may include to a geographic area (e.g., an office building's footprint) defined by a known secure location (e.g., centered around a known secure GPS location) such that failure to satisfy the security threshold at Block 320 occurs when calculation of the mathematical difference between the geographic location of the first user device 106 and/or the second user device 108 and the known secure location is greater than a predetermined distance value of the geographic area. Said differently, a known secure location, such as a user's work office, may be associated with a secure delivery context with a security threshold that corresponds to the geographic footprint of the user's work office (e.g., a central GPS location coordinate for the work office and a radius of eight (8) feet extending therefrom). In contrast, an unsecure delivery context may occur when the mathematical difference between the GPS location coordinates of the first user device 106 and the central GPS location coordinate defined by the user's office is greater than the example radius of eight (8) feet (e.g., determining, contextually, that the user is not in their office).

The contextual protection server 200 may further include means, such as the processor 202, the input/output circuitry 206, the content protection circuitry 212, or the like, for, in response to determining the unsecure delivery context, generating secured digital content at Block 325 and for causing presentation of the secured digital content via a second user device 108 associated with the first user profile at Block 330.

As described in detail below with reference to FIG. 4, in some embodiments, generating secured digital content at Block 325 includes encrypting the digital content via encryption/decryption circuitry 214 for subsequent transmission to the first user device 106 in an encrypted form. However, the present disclosure contemplates that, with continued reference to FIG. 3, the digital content may be presented to the user via various interactions between the first user device 106 and the second user device 108. By way of example, in some embodiments, the digital content may be secured via the content protection circuitry 212 by transmitting the digital content (e.g., without encryption of the digital content) for rendering on the second user device 108, alone. Said differently, in some embodiments in which the second user device 108 is only viewable by the user (e.g., smart glasses or the like), the contextual protection server 200 may display the secured digital content generated at Block 325 on the second user device 108 alone at Block 330.

In other embodiments, for example, in which the second user device 108 may be viewable by other users, such as instances in which the second user device 108 is a mobile telephone, tablet, or the like, the second user device 108 may operate to enable viewing of the secured digital content displayed by the first user device 106. In such an embodiment, the contextual protection server 200 may generate the secured digital content at Block 325 by obscuring, redacting, or otherwise causing the secured digital content to be indecipherable when rendered. The secured digital content may then be transmitted to the first user device 106 at Block 330 such that the secured digital content is rendered by the first user device 106 in an indecipherable form. The contextual protection server 200 may then transmit, to the second user device 108 associated with the first user profile instructions for viewing the secured digital content on the second user device 108. By way of continued example, the contextual protection server 200 may supply instructions to a mobile telephone (e.g., second user device 108) for capturing the secured digital content rendered by the first user device 106 (e.g., via a camera defined by the mobile telephone or the like) and rendering the secured digital content on the mobile telephone (e.g., the second user device 108) in a deciphered or otherwise viewable form. In other embodiments, data associated with or otherwise indicative of instructions for viewing the secured digital content may be generated, transmitted, and caused to display at the first user device 106 (e.g., in the form of a QR code or the like), which, when captured or scanned by the second user device 108, causes display or rendering of the secured digital content at the second device 108.

In some further embodiments, in which the second user device 108 may be viewable by other users, the second user device 108 may operate to enable viewing of the secured digital content on the first user device 106. In such an embodiment, the contextual protection server 200 may generate the secured digital content at Block 325 by obscuring, redacting, or otherwise causing the secured digital to be indecipherable when rendered. The secured digital content may then be transmitted to the first user device 106 at Block 330 such that the secured digital content is rendered by the first user device 106 in an indecipherable form. The contextual protection server 200 may then transmit, to the second user device 108 associated with the first user profile, instructions for viewing the secured digital content on the first user device 106. In such an embodiment, the contextual protection server 200 may supply instructions to a mobile telephone (e.g., second user device 108) which may be received by the first user device 106. The instructions may cause the previously indecipherable secured digital content to render in a deciphered or otherwise viewable form on the first user device 106.

In such an embodiment, the contextual protection server 200 may monitor the geographic location data of the second user device 108 to ensure the second user device 108 remains proximate the first user device 106. By way of continued example, the mobile telephone (e.g., second user device 108) of the user may receive instructions from the contextual protection server 200 which may be received by the laptop computer (e.g., first user device 106) from the mobile telephone (e.g., second user device 108). To increase security, the contextual protection server 200 may require that the mobile telephone and laptop computer remain proximate (e.g., close to, within a set boundary, etc.) one another in order for the secured digital content to be presented in a viewable form. Said differently, if one of the mobile telephone or laptop computer is stolen or lost, the secured digital content will return to a indecipherable or otherwise unviewable form. By way of example, in some embodiments, tethering between the first user device 106 and the second user device 108 (e.g., via physical connection, Bluetooth connection, etc.) may be required by the contextual protection server 200 to ensure the first user device 106 and the second user device 108 remain proximate one another.

In some still further embodiments, the secured digital content may include timing restrictions data. In such an embodiment, the secured digital content may be renderable on a user device (e.g., first user device 106 and/or second user device 108) for a pre-determined time period. By way of example, a notification requesting account authorization from a bank (e.g., digital content) may be transmitted to a user's laptop computer (e.g., first user device 106) in an encrypted form. The user's mobile telephone (e.g., second user device 108) may operate to decrypt the encrypted notification (e.g., encrypted secured digital content) only for the duration of the pre-determined time period.

Figure 4:
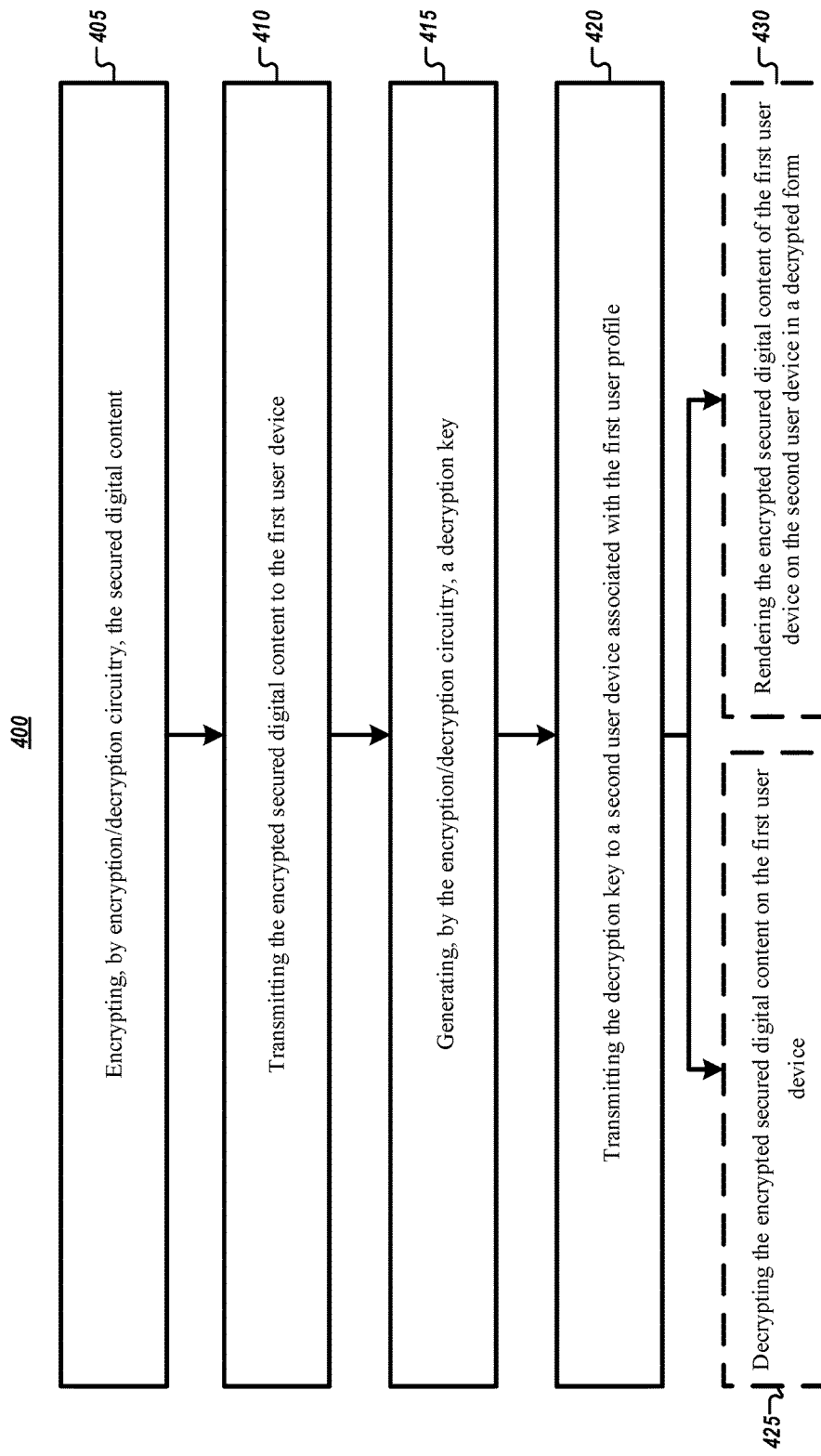
FIG. 4 illustrates an example flowchart for encrypting and decrypting secured digital content in accordance with some example embodiments described herein.

With reference to FIG. 4, an example flowchart for encrypting and decrypting secured digital content is illustrated. In some embodiments, the contextual protection server 200 may further include means, such as the processor 202, the input/output circuitry 206, the encryption/decryption circuitry 214, or the like, for encrypting the secured digital content at Block 405 and generating a decryption key at Block 415. As described in detail above, the content protection circuitry 212 may, in some embodiments, include encryption/decryption circuitry 214. In any of the embodiment described herein, the encryption/decryption circuitry 214 may be configured to secure the digital content by encrypting the digital content at Block 405 via any encryption process, protocol, or algorithm known in the art (e.g., symmetric key, public key, private key, RSA, Triple DES, Blowfish, Twofish, AES, etc.).

The contextual protection server 200 may further include means, such as the processor 202, the input/output circuitry 206, the communications circuitry 208, or the like, for transmitting the encrypted secured digital content to the first user device 106 at Block 410 and transmitting the decryption key to a second user device 108 associated with the first user profile at Block 420. As described above with reference to FIG. 3, interactions between the first user device 106 and the second user device 108 may serve to render the encrypted secured digital content for viewing by the user. In some embodiments, the contextual protection server 200 may further include means, such as the processor 202, the input/output circuitry 206, the communications circuitry 208, or the like, for decrypting the encrypted secured digital content on the first user device 106 at Block 425 and/or rendering the encrypted secured digital content of the first user device 106 on the second user device 108 in a decrypted form at Block 430.

While the present disclosure describes rendering the entire secured (and potentially encrypted) digital content on either the first user device 106 or the second user device 108, the present disclosure contemplates that any portion or sub-portion of the secured digital content may be rendered viewable on the first user device 106 and the second user device 108 simultaneously. By way of example, in some embodiments, a portion of the secured digital content may be encrypted by a first encryption protocol and transmitted in encrypted form to the first user device 106 while a first decryption key is transmitted to the second user device 108. Further, a portion of the secured digital content may be encrypted by a second encryption protocol and transmitted in encrypted form to the second user device 108 while a second decryption key is transmitted to the first user device 106. In this way, each user device (e.g., the first user device 106 and the second user device 108) is configured to decrypt a portion of the secured digital content and render the respective portion on the respective user device.

With reference to FIG. 5, an example flowchart for determining a contextual security score is illustrated. In some embodiments, the contextual protection server 200 may further include means, such as the processor 202, the input/output circuitry 206, the contextual analysis circuitry 210, or the like, for determining a contextual security score based upon a comparison of the contextual device data and a secure context dataset 112 at Block 510. The embodiment as illustrated in FIG. 5 corresponds to the method for securely delivering digital content as illustrated in FIG. 3, but includes additional calculation regarding a contextual security score based upon the contextual device data.

In particular, in some embodiments, the contextual device data of the first user device 106 may include contextual data indicative of various locations. By way of example, a user's laptop computer (e.g., first user device 106) may be connect to a public Wi-Fi access point while also having geographic location data (e.g., GPS location data) corresponding to the user's office building. In such an embodiment, the connection to a public Wi-Fi access point may indicate (via comparison with one or more security thresholds) that the device delivery context is unsecure. The geographic location data, however, may conversely indicate (via comparison with one or more security thresholds) that the device delivery context is secure. In such an instance, the contextual protection server 200 may default to determining an unsecured delivery context to ensure security. As illustrated in FIG. 5, however, in some embodiments, the contextual protection server 200 may calculate a contextual security score or otherwise rank contextual device data entries to more accurately determine the delivery context of the first user device 106.

In determining the contextual security score at Block 510 and comparing the contextual security score of the first user device 106 with one or more security thresholds defined by the secure context dataset 112 at Block 515, the contextual protection server 200 may score and/or rank each contextual device data entry. By way of example, each contextual device data entry may first be categorized according to the source of the data entry (e.g., Wi-Fi access points, GPS coordinates, first user security permissions data, etc.) and, in some embodiments, the contextual security score associated with each category may be weighted (e.g., set by a system administrator, user input, or the like). By way of example, the contextual protection server 200 may attribute a higher weighted score to a user-confirmed Wi-Fi access point corresponding to the user's personal office in a secured office building as compared to an unconfirmed GPS coordinate with geographic location data indicative of a public location.

The contextual protection server 200, in some embodiments, may analyze each category of contextual device data and increase the contextual security score from zero (0) in each instance in which the category satisfies one or more security thresholds (e.g., defined by digital content). For example, a word processing document (e.g., digital content) may require a contextual security score of three (3) in order to be presented to a user. The contextual protection server 200 may analyze a first category of contextual device data concerning GPS location and increase the contextual security score by one (1) in an instance in which the GPS location of the first user device 106 is indicative of a secure location. Similarly, the contextual protection server 200 may analyze a second category of contextual device data concerning Wi-Fi access points and increase the contextual security score by one (1) (e.g., to a total of two (2)) in an instance in which the first user device 106 is connected to a secure Wi-Fi access point. Further, the contextual protection server 200 may analyze a third category of contextual device data concerning first user security permission data and increase the contextual security score by one (1) (e.g., to a total of three (3)) in an instance in which the first user security permission data is indicative of a user's permission to access said digital content. In such an embodiment, the contextual user device 200 may cause presentation of the secured digital content via a second user device 108 associated with the first user profile as the contextual security score of the first user device 106 satisfied a contextual security score threshold (e.g., a score of three (3)).

With reference to FIG. 6, the contextual protection server 200 may further increase security and accuracy in subsequent determinations of the methods illustrated in FIGS. 3-5 by requesting user confirmed contextual device data for training a machine learning model. As illustrated, the contextual protection server 200 may further include means, such as the processor 202, the input/output circuitry 206, the input/output circuitry 206, or the like, for requesting a user confirmation of the contextual device data of the first user device 106 at Block 615. By way of example, the contextual protection server 200 may periodically transmit a notification to the first user device 106 and/or the second user device 108, to which a user may confirm the location of the user device (e.g., Are you in the your office?). In some embodiments, the contextual protection server 200 may transmit a notification to a user device other than the first user device 106 and the second user device 108 (e.g., a user's mobile telephone not used in viewing the digital content). In this way, the contextual protection server 200 may increase fraud protection by notifying a separate user device, unrelated to the viewing of the digital content, of access to the digital content. Furthermore, the periodically transmitted user notification may operate to explicitly confirm the contextual device data of the first user device 106 (e.g., Are you in a secure location for viewing this document?). The contextual protection server 200 may further include means, such as the processor 202, the input/output circuitry 206, the communications circuitry 210, or the like, for, supplying the device delivery context to a machine learning model in order to improve subsequent determinations of the method (e.g., device delivery contexts, contextual device data, etc.) at Block 625.

As illustrated by the example embodiments above, the technical challenges regarding secure delivery and presentation of digital content to a user are herein achieved by contextual determinations and access to multiple devices associated with the same user. The example implementations of the present invention reliably detect the context of a user and associated user device and securely present digital content to the user based upon the determined context of the user.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for securely delivering digital content to a user, the method comprising:
receiving a request for digital content for presentation by a first user device associated with a first user profile;
receiving contextual device data of the first user device associated with the first user profile;
receiving a secure context dataset associated with at least one of the requested digital content or the first user profile;
comparing the contextual device data of the first user device and the secure context dataset associated with the at least one of the requested digital content or the first user profile to generate a contextual security score;
determining a device delivery context of the first user device based on the contextual security score;
determining an unsecure delivery context of the first user device in an instance in which the contextual device data of the first user device fails to satisfy one or more security thresholds defined by the secure context dataset; and
in response to determining the unsecure delivery context:
generating secured digital content; and
causing presentation of the secured digital content on the first user device via a second user device associated with the first user profile by:
transmitting the secured digital content to the first user device; and
transmitting a decryption key to the second user device, wherein the decryption key enables presentation of the secured digital content on the first user device.

2. The method according to claim 1, wherein the secure context dataset comprises one or more locations associated with the first user profile.

3. The method according to claim 1, wherein the contextual device data is associated with a plurality of respective contextual device data categories, and the comparison of the contextual device data comprises comparisons of contextual device data and security thresholds for respective contextual device data categories.

4. The method according to claim 1, wherein causing presentation of the secured digital content further comprises: encrypting the secured digital content.

5. The method according to claim 4, wherein the decryption key comprises instructions for decrypting and rendering the encrypted secured digital content on the first user device in a decrypted form.

6. The method according to claim 1, wherein determining the device delivery context of the first user device further comprises analyzing one or more first user security permissions defined by the first user profile.

7. The method according to claim 1, further comprising requesting a user confirmation of the contextual device data of the first user device.

8. The method according to claim 1, upon determining the device delivery context of the first user device, further comprising supplying the device delivery context to a machine learning model in order to improve subsequent determinations of the method.

9. The method according to claim 1, wherein the secured digital content comprises timing restrictions data.

10. The method according to claim 1, wherein causing presentation of the secured digital content on the first user device via the second user device further comprises rendering a first portion of the secure digital content in decrypted form on the first user device and a second portion of the secure digital content in decrypted form on the second user device.

11. An apparatus comprising at least one processor and at least one memory including computer program code, the at least one memory and the computer program code configured to, with the processor, cause the apparatus to at least:
receive a request for digital content for presentation by a first user device associated with a first user profile;
receive contextual device data of the first user device associated with the first user profile;
receive a secure context dataset associated with at least one of the requested digital content or the first user profile;
compare the contextual device data of the first user device and the secure context dataset associated with the at least one of the requested digital content or the first user profile to generate a contextual security score;
determine a device delivery context of the first user device based on the contextual security score;
determine an unsecure delivery context of the first user device in an instance in which the contextual device data of the first user device fails to satisfy one or more security thresholds defined by the secure context dataset; and
in response to determining the unsecure delivery context:
generate secured digital content; and
cause presentation of the secured digital content on the first user device via a second user device associated with the first user profile by:
transmitting the secured digital content to the first user device; and
transmitting a decryption key to the second user device, wherein the decryption key enables presentation of the secured digital content on the first user device.

12. The apparatus according to claim 11, wherein the secure context dataset comprises one or more locations associated with the first user profile.

13. The apparatus according to claim 11, wherein the contextual device data is associated with a plurality of respective contextual device data categories, and the comparison of the contextual device data comprises comparisons of contextual device data and security thresholds for respective contextual device data categories.

14. The apparatus according to claim 11, wherein causing presentation of the secured digital content comprises:
encrypting the secured digital content.

15. The apparatus according to claim 14, wherein the decryption key comprises instructions for decrypting and rendering the encrypted secured digital content on the first user device in a decrypted form.

16. The apparatus according to claim 11, wherein determining the device delivery context of the first user device further comprises analyzing one or more first user security permissions defined by the first user profile.

17. The apparatus according to claim 11, wherein the at least one memory and the computer program code are further configured to cause the apparatus to at least:
request a user confirmation of the contextual device data of the first user device.

18. A computer program product comprising at least one non-transitory computer-readable storage medium having computer-executable program code instructions stored therein, the computer-executable program code instructions comprising program code instructions to:
receive a request for digital content for presentation by a first user device associated with a first user profile;
receive contextual device data of the first user device associated with the first user profile;
receive a secure context dataset associated with at least one of the requested digital content or the first user profile;
compare the contextual device data of the first user device and the secure context dataset associated with the at least one of the requested digital content or the first user profile to generate a contextual security score;
determine a device delivery context of the first user device based on the contextual security score;
determine an unsecure delivery context of the first user device in an instance in which the contextual device data of the first user device fails to satisfy one or more security thresholds defined by the secure context dataset; and
in response to determining the unsecure delivery context:
generate secured digital content; and
cause presentation of the secured digital content on the first user device via a second user device associated with the first user profile by:
transmitting the secured digital content to the first user device; and
transmitting a decryption key to the second user device, wherein the decryption key enables presentation of the secured digital content on the first user device.

\* \* \* \* \*